United States Patent
Takaki et al.

(10) Patent No.: US 8,057,948 B2
(45) Date of Patent: Nov. 15, 2011

(54) FUEL CELL SYSTEM THAT CONTINUES OPERATION IN THE EVENT OF A SENSOR ABNORMALITY

(75) Inventors: Sadao Takaki, Osaka (JP); Tetsuya Bono, Aichi (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 1162 days.

(21) Appl. No.: 11/794,890

(22) PCT Filed: Jan. 10, 2006

(86) PCT No.: PCT/JP2006/000406
§ 371 (c)(1),
(2), (4) Date: Jul. 9, 2007

(87) PCT Pub. No.: WO2006/075722
PCT Pub. Date: Jul. 20, 2006

(65) Prior Publication Data
US 2008/0145730 A1 Jun. 19, 2008

(30) Foreign Application Priority Data

Jan. 11, 2005 (JP) .................... 2005-004454

(51) Int. Cl.
*H01M 8/00* (2006.01)
*H01M 8/04* (2006.01)
(52) U.S. Cl. ......... 429/443; 429/428; 429/444; 429/446
(58) Field of Classification Search ............. 429/428, 429/443, 444, 446
See application file for complete search history.

(56) References Cited

U.S. PATENT DOCUMENTS

| 2001/0014415 A1 | 8/2001 | Iio |
| 2002/0148502 A1 | 10/2002 | Fujita |
| 2003/0157383 A1 * | 8/2003 | Takahashi ............... 429/22 |
| 2004/0161645 A1 | 8/2004 | Poschmann |

FOREIGN PATENT DOCUMENTS

| EP | 1 231 661 A2 | 8/2002 |
| EP | 1231661 | * 8/2002 |
| JP | 61-116765 A | 6/1986 |
| JP | 2002-352839 A | 12/2002 |
| JP | 2003-92125 A | 3/2003 |
| JP | 2003-168453 A | 6/2003 |
| JP | 2003-168467 A | 6/2003 |

(Continued)

*Primary Examiner* — Barbara Gilliam
*Assistant Examiner* — Steven Scully
(74) *Attorney, Agent, or Firm* — Kenyon & Kenyon LLP

(57) ABSTRACT

A fuel cell system (10) of the present invention has a fuel cell (20) which generates electric power by being supplied with reactive gas, an air compressor (C1) which supplies oxidizing gas to the fuel cell (20), a pressure sensor (P2) which detects the pressure of oxidizing gas, a pressure control valve (C2) which adjusts the pressure of oxidizing gas, and a control device (50) which adjusts the valve opening of the pressure control valve (C2) on the basis of the pressure detected by the pressure sensor (P2). When an abnormality in the pressure sensor (P2) is detected, the control device (50) opens the pressure control valve (C2) so that the valve opening thereof is equal to or larger than a predetermined opening. This arrangement ensures that the cell operation can be continued for a while instead of being immediately stopped in the event of abnormality in the pressure sensor (P2).

11 Claims, 3 Drawing Sheets

FOREIGN PATENT DOCUMENTS

| | | |
|---|---|---|
| JP | 2003-178789 A | 6/2003 |
| JP | 2004-178846 A | 6/2004 |
| JP | 2004-179072 A | 6/2004 |
| JP | 2004-179127   * | 6/2004 |
| JP | 2004-179127 A | 6/2004 |
| JP | 2004-253220 A | 9/2004 |
| JP | 2004-259670 A | 9/2004 |
| JP | 2004-342430 A | 12/2004 |
| JP | 2004-362825 A | 12/2004 |

* cited by examiner

FUEL CELL SYSTEM THAT CONTINUES OPERATION IN THE EVENT OF A SENSOR ABNORMALITY

This is a 371 national phase application of PCT/JP2006/300406 filed 10 Jan. 2006, claiming priority to Japanese Patent Application No. 2005-004454 filed 11 Jan. 2005, the contents of which are incorporated herein by reference.

BACKGROUND

The present invention relates to a fuel cell system and, more particularly, to a fail-safe technique provided to cope with an abnormality in a gas condition detection means (gas state detector) for detecting a gas condition of a reactive gas.

In a fuel cell vehicle which travels by driving a traction motor by electric power generated in a fuel cell system, the electric power required of the system is computed on the basis of the acceleration opening and the vehicle speed for example, and the rate of supply of reactive gas and the pressure at which reactive gas is supplied are controlled so that the electric power generated in the fuel cell system equals the target electric power. In Japanese Patent Laid-Open No. 2003-168467 is proposed a controller for a fuel cell system for use in a vehicle in which the air pressure at an air pole is controlled at a target pressure by operating at a target rotational speed a compressor for compressing air to be supplied to the air pole and by operating an air pressure control valve. This document discloses a technique to correct a target rotational speed by estimating atmospheric pressure on the basis of operating parameters of a compressor necessary for maintaining the target rotational speed of the compressor or maintaining the air pressure at a target pressure and to limit the amount of electric power generated in a fuel cell by correcting the time period during which a hydrogen package valve is opened.

SUMMARY

In the conventional fuel cell system, however, accurate control on the air compressor becomes impossible when an abnormality occurs in a pressure sensor for detecting the pressure of oxide gas. In such a situation, therefore, the cell operation is stopped. In a fuel cell system used as a vehicle power supply, it is desirable to take a fail-safe measure in advance against an abnormality in a pressure sensor in order to enable a limp home run (safe return run) to the nearest dealer or a shop.

It is, therefore, an object of the present invention to take a fail-safe measure in advance against an abnormality in a gas condition detection means (gas condition detector) for detecting a gas condition of reactive gas supplied to a fuel cell.

To achieve the above-described object, according to the present invention, there is provided a fuel cell system including a fuel cell which generates electric power by being supplied with reactive gas, a reactive gas supply device which supplies reactive gas to the fuel cell, a pressure detection means (pressure detector) for detecting the pressure of the reactive gas, a pressure control valve for controlling the pressure of the reactive gas, and a control device which adjusts the valve opening of the pressure control valve on the basis of the pressure detected by the pressure detection means (pressure detector), wherein the control device opens the pressure control valve to a predetermined opening when detecting an abnormality in the pressure detection means (pressure detector). This arrangement ensures that the cell operation can be continued for a while instead of being immediately stopped in the event of abnormality in the pressure detection means (pressure detector).

Preferably, the control device sets the valve opening of the pressure control valve to a fixed opening of 80% or more (e.g., the full opening) when detecting an abnormality in the pressure detection means (pressure detector). If the valve opening of the pressure control valve is set to a fixed opening of 80% or more, damage to system component parts or the like can be avoided even under a high load.

Preferably, the pressure control valve is provided in at least one of a fuel gas passage (including a hydrogen supply passage, a hydrogen circulation passage and a hydrogen discharge passage) in which fuel gas to be supplied to the fuel cell or fuel gas discharged from the fuel cell flows and an oxidizing gas passage (including an oxygen supply passage and an oxygen discharge passage) in which oxidizing gas to be supplied to the fuel cell or oxidizing gas discharged from the fuel cell flows.

Preferably, the control device controls electric power generation in the fuel cell on the basis of the valve opening value of the pressure control valve when detecting an abnormality in the pressure detection means (pressure detector). A suitable cell operation can be achieved by performing electric power generation control according to the valve opening of the pressure control valve.

The pressure control valve may be provided in at least one of a supply passage (oxygen supply passage) and a discharge passage (oxygen discharge passage) in the oxidizing gas passage, and the valve opening of the pressure control valve may be set to the predetermined opening when an abnormality is detected in the pressure detection means provided in the oxidizing gas passage.

The pressure control valve may be provided in at least one of a supply passage (a hydrogen supply passage, a hydrogen circulation passage) and a discharge passage (a hydrogen circulation passage, a hydrogen discharge passage) in the fuel gas passage, and the valve opening of the pressure control valve may be set to the predetermined opening when an abnormality is detected in the pressure detection means provided in the fuel gas passage.

The control device may determine that an abnormality has occurred in the pressure detection means when the detection value from the pressure detection means is out of a predetermined range (when the sensor value is equal to or larger than an upper-limit threshold value or smaller than a lower-limit threshold value).

The control device may determine that an abnormality has occurred in the pressure detection means if the detection value from the pressure detection means is kept out of the predetermined range (the sensor value is kept equal to or larger than the upper-limit threshold value or smaller than the lower-limit threshold value) over a certain time period.

The control device may determine that an abnormality has occurred in the pressure detection means when a disconnection in the pressure detection means is detected.

The control device may estimate the pressure of reactive gas corresponding to the valve opening of the pressure control valve when detecting an abnormality in the pressure detection means, and control electric power generation in the fuel cell on the basis of the estimated value.

The control device may store as map data the pressures of oxidizing gas flowing in portions of the oxidizing gas passage in the case where the valve opening of the pressure control valve provided in the oxidizing gas passage is fixed at the predetermined opening, estimate the pressures of oxidizing gas flowing in the oxidizing gas passage by referring to the map data, and control electric power generation in the fuel cell on the basis of the estimated value.

According to the present invention, there is also provided a fuel cell system including a fuel cell which generates electric power by being supplied with reactive gas, a reactive gas supply device which supplies reactive gas to the fuel cell, a gas condition detection means (gas condition detector) for detecting a gas condition of the reactive gas, a valve device for changing the gas condition of the reactive gas, and a control device which adjusts the valve opening of the valve device on the basis of the gas condition detected by the gas condition detection means (gas condition detector), wherein the control device opens the valve device to a predetermined opening when detecting an abnormality in the gas condition detection means (gas condition detector). This arrangement ensures that the cell operation can be continued for a while instead of being immediately stopped in the event of abnormality in the gas condition detection means (gas condition detector). The valve device comprises various valves such as a pressure control valve, an opening/closing valve (on/off valve) and a linear valve.

The gas condition detected by the gas condition detection means is, for example, one of the pressure, the flow rate, the temperature and the concentration of the reactive gas. That is, "gas condition detection means (gas condition detector)" refers generally to a pressure detection means (pressure detector) for detecting the pressure of reactive gas, a flow rate detection means (flow rate detector, flow rate sensor) for detecting the rate of flow of reactive gas, a temperature detection means (temperature detector, temperature sensor) for detecting the temperature of reactive gas, and a concentration detection means (concentration detector, concentration sensor) for detecting the concentration of reactive gas.

Preferably, the control device estimates a gas condition value of reactive gas corresponding to the valve opening of the valve device when detecting an abnormality in the gas condition detection means (gas condition detector), and controls electric power generation in the fuel cell on the basis of the estimated value. Suitable cell operation can be realized by performing power generation control according to the valve opening of the valve device.

The control device may store as map data gas condition values of oxidizing gas flowing in portions of the oxidizing gas passage in the case where the valve opening of the valve device provided in the oxidizing gas passage is fixed at the predetermined opening, estimate the gas condition value of oxidizing gas flowing in the oxidizing gas passage by referring to the map data, and control electric power generation in the fuel cell on the basis of the estimated value.

The control device may control electric power generation in the fuel cell on the basis of the opening value of the valve device when detecting an abnormality in the gas condition detection means.

The valve device may be provided in at least one of a fuel gas passage in which fuel gas to be supplied to the fuel cell or fuel gas discharged from the fuel cell flows and an oxidizing gas passage in which oxidizing gas to be supplied to the fuel cell or oxidizing gas discharged from the fuel cell flows.

The valve device may be provided in at least one of a supply passage (oxygen supply passage) and a discharge passage (oxygen discharge passage) in the oxidizing gas passage, and the valve opening of the valve device may be set to the predetermined opening when an abnormality is detected in the gas condition detection means provided in the oxidizing gas passage.

The valve device may be provided in at least one of a supply passage (hydrogen supply passage, hydrogen circulation passage) and a discharge passage (hydrogen circulation passage, hydrogen discharge passage) in the fuel gas passage, and the valve opening of the valve device may be set to the predetermined opening when an abnormality is detected in the gas condition detection means provided in the fuel gas passage.

The control device may determine that an abnormality has occurred in the gas condition detection means when the detection value from the gas condition detection means is out of a predetermined range (when the sensor value is equal to or larger than an upper-limit threshold value or smaller than a lower-limit threshold value).

The control device may determine that an abnormality has occurred in the gas condition detection means if the detection value from the gas condition detection means is kept out of the predetermined range over a certain time period (the sensor value is kept equal to or larger than the upper-limit threshold value or smaller than the lower-limit threshold value).

The control device may determine that an abnormality has occurred in the gas condition detection means when a disconnection in the gas condition detection means is detected.

The above-described valve opening may be construed as the open/closed state of the pressure control valve or the valve device or the area of an opening formed by opening/closing of a valve member.

The above-described reactive gas supply device may be construed to have at least one of a gas storage device such as a gas tank, a gas generation device such as a reformer, gas supply passages for supplying reactive gas (e.g., a hydrogen supply passage, a hydrogen circulation passage and an oxygen supply passage) and gas discharge passages for discharging reactive gas (e.g., a hydrogen circulation passage, a hydrogen discharge passage and an oxygen discharge passage).

A fuel cell vehicle according to the present invention is a vehicle in which the above-described fuel cell system is mounted as a vehicle power supply. This arrangement enables limp home run of the fuel cell vehicle without stopping the cell operation even in the event of an abnormality in the pressure detection means (pressure detector).

DETAILED DESCRIPTION

An embodiment of the present invention will be described with reference to the drawings.

Figure 1:
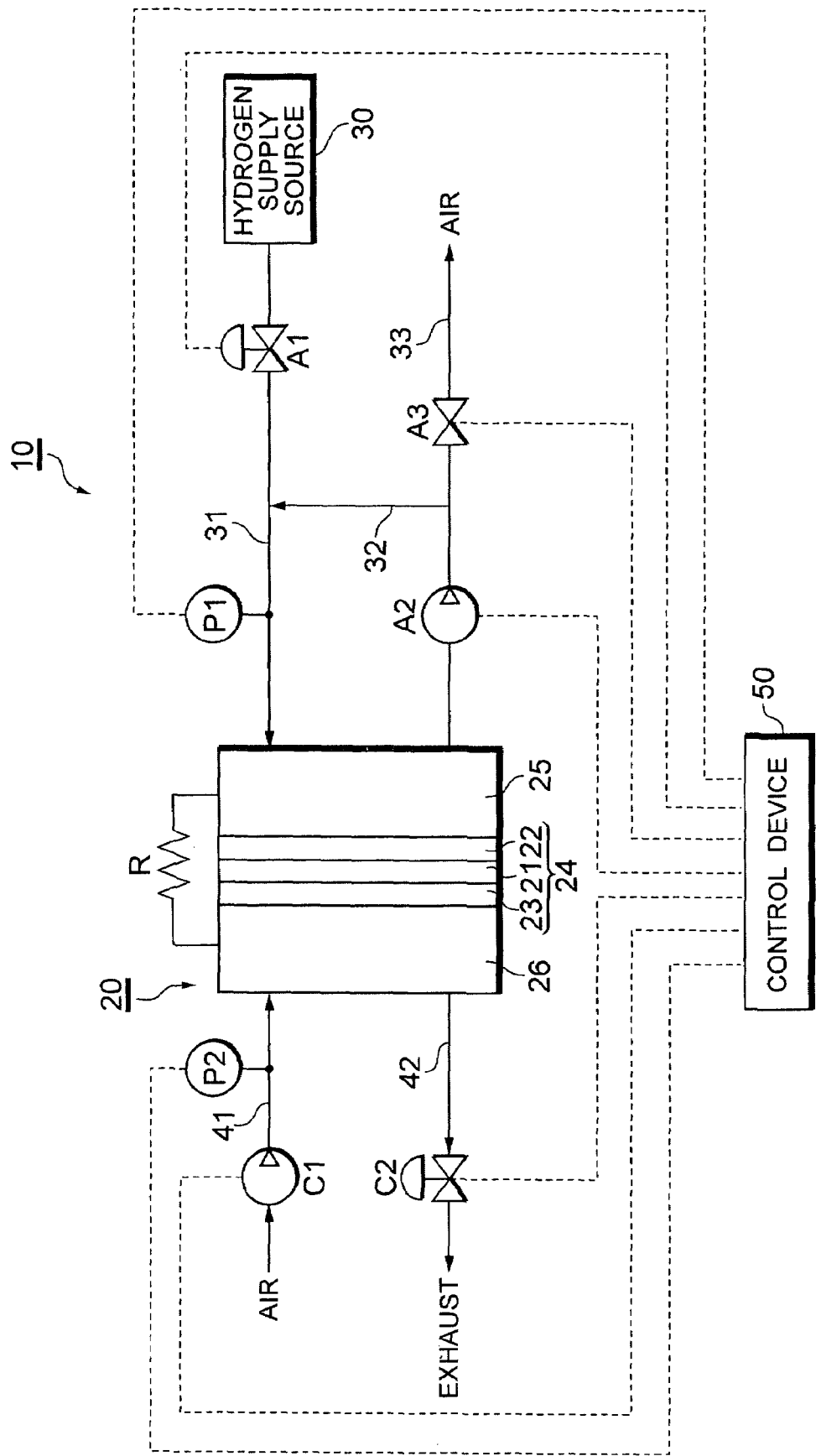
FIG. 1 is a configuration diagram for a fuel cell system according to the embodiment.

FIG. 1 schematically shows the configuration of a fuel cell system 10 according to the embodiment. The system 10 is configured as a power generation apparatus (vehicle power supply apparatus) to be mounted in a fuel cell vehicle, has as a fuel cell 20 which generates electric power by being supplied with a reactive gas (fuel gas, oxidizing gas). The fuel cell 20 has a membrane electrode assembly 24 having an anode 22 and a cathode 23 formed by screen printing or the like on both sides of a polymeric electrolytic membrane 21 constituted by a proton-conductive ion-exchange membrane or the like formed of a fluororesin or the like. Both sides of the membrane electrode assembly 24 are sandwiched between separators with ribs (not shown), and anode gas channels 25 and cathode gas channels 26 in the form of grooves are respectively formed between the separators, the anode 22 and the cathode 23. Electric power generated in the fuel cell 20 is consumed by an external load R. The external load R is a generic name, for example, for an inverter for converting direct current electric power into alternating current electric power, a traction motor for obtaining traveling motive force and auxiliary vehicle equipment.

A hydrogen supply source (fuel gas supply device) 30 is constituted by a high-pressure hydrogen tank, a hydrogen storage alloy tank or the like. Hydrogen gas released from the hydrogen supply source 30 is caused to flow through a hydrogen supply passage 31 to be supplied to the anode 22. The pressure of hydrogen supplied to the anode 22 is controlled at (reduced to) a predetermined pressure by a pressure control valve A1. Hydrogen-off gas used in cell reaction is pressurized by a circulation pump A2 and caused to flow through a hydrogen circulation passage 32 to be returned to the hydrogen supply passage 31. A hydrogen discharge passage 33 is provided which branches off from the hydrogen circulation passage 32, and through which hydrogen gas of a high impurity concentration is discharged by opening a hydrogen exhaust valve A3. The hydrogen supply pressure is detected with a pressure sensor (a pressure detection means, a pressure detector, a gas condition detection means, a gas condition detector) P1. On the other hand, air (oxygen gas) taken in from the outside air is pressurized by an air compressor (oxidizing gas supply device) C1 and caused to flow through an oxygen supply passage 41 to be supplied to the cathode 23. Oxygen-off gas used in cell reaction is caused to flow through an oxygen discharge passage 42 to be discharged. The pressure of oxygen gas supplied to the cathode 23 is controlled at a predetermined pressure by a pressure control valve C2. The oxygen supply pressure is detected with a pressure sensor (a pressure detection means, a pressure detector, a gas condition detection means, a gas condition detector) P2.

A control device 50 is a system controller for performing electric power generation control on the fuel cell 20 according to a required load. The control device 50 computes electric power required of the system on the basis of the acceleration opening and the vehicle speed for example and controls the pressures of hydrogen gas and oxygen gas so that the electric power generated in the fuel cell 20 equals the target electric power. More specifically, the control device 50 controls the valve opening of the pressure control valve A1 on the basis of the pressure detected with the pressure sensor P1 so that the hydrogen supply pressure equals the target pressure, and also controls the valve opening of the pressure control valve A2 on the basis of the pressure detected with the pressure sensor P2 so that the oxygen supply pressure equals the target pressure.

A fail-safe measure in a case where an abnormality occurs in the pressure sensor P2 will next be described.

Figure 2:
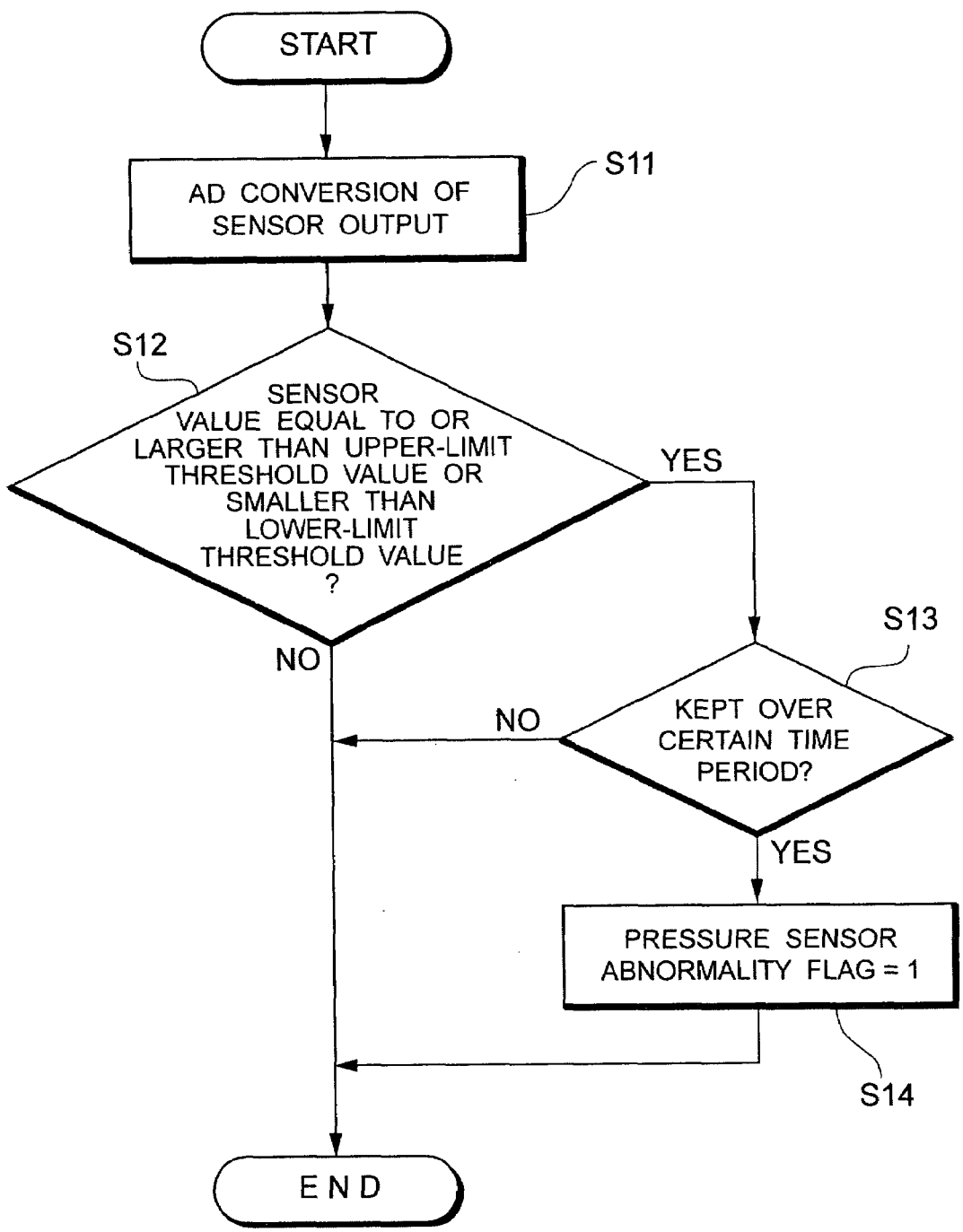
FIG. 2 is a pressure sensor abnormality determination routine.

FIG. 2 shows a pressure sensor P2 abnormality determination routine. This determination routine is repeatedly executed at certain intervals (for example, of 2 milliseconds) by the control device 50. When this determination routine is called up, the control device 50 performs AD conversion of an analog output value from the pressure sensor P2 into digital data (S11). The control device 50 then determines whether this sensor value (digital value) is equal to or larger than an upper-limit threshold value or smaller than a lower-limit threshold value (S12). If the sensor value is smaller than the upper-limit threshold value and equal to or larger than the lower-limit threshold value (S12; NO), the pressure sensor P2 is operating normally and, therefore, the control device 50 exits this routine. If the sensor value is equal or larger than the upper-limit threshold value or smaller than the lower-limit threshold value (S12; YES), there is a possibility of the occurrence of abnormality in the pressure sensor P2 due to disconnection or the like and, therefore, the control device 50 determines whether or not the sensor value (digital value) is kept equal to or larger than the upper-limit threshold value or smaller than the lower-limit threshold value over a certain time period (S13). If the sensor value is not kept in the abnormal value range over the certain time period (S13; NO), the sensor value in the abnormal range is considered due to a temporary detection error or the like in the pressure sensor P2, and the control device 50 determines that the pressure sensor P2 is operating normally and exits this determination routine. If the sensor value is kept in the abnormal value range over the certain time period (S13; YES), it can be determined that an abnormality has occurred in the pressure sensor P2 and, therefore, the control device 50 sets a pressure sensor abnormality flag to 1 (S14) and exits this determination routine.

Figure 3:
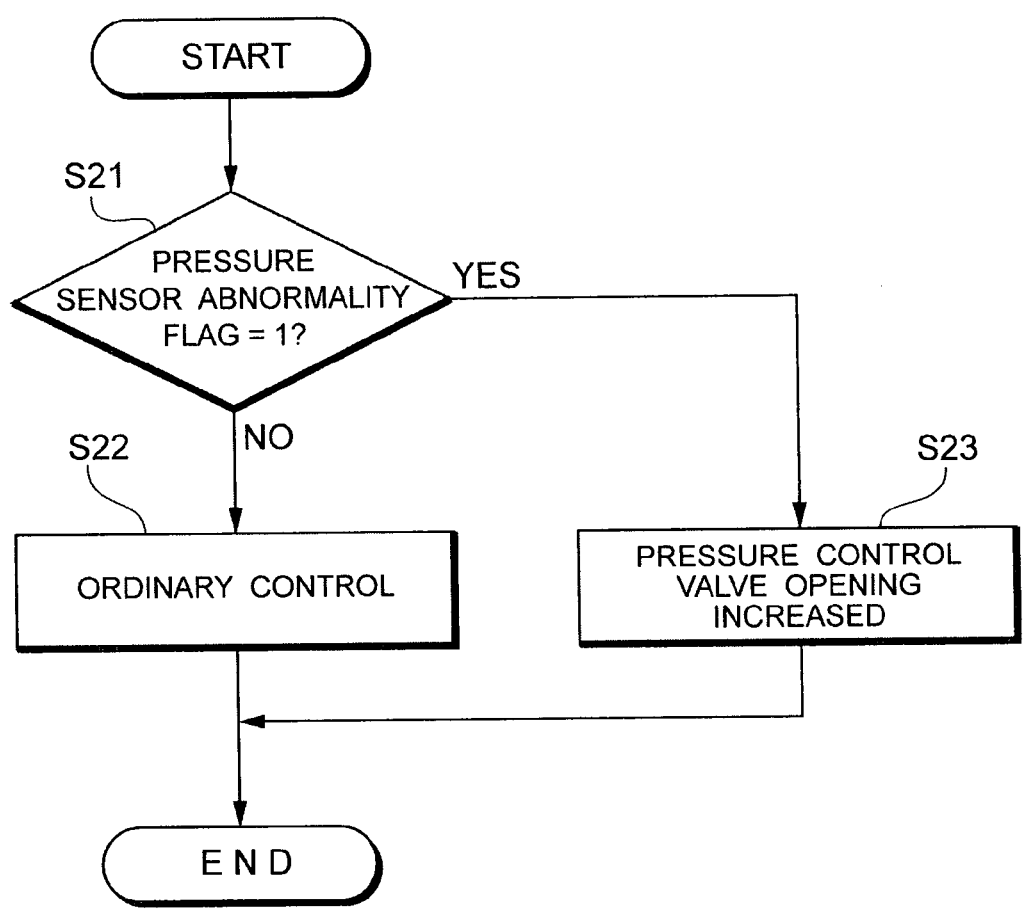
FIG. 3 is a pressure control valve control routine.

FIG. 3 shows a control value C2 control routine. This control is repeatedly executed at certain intervals (for example, of 8 milliseconds) by the control device 50. When this control routine is called up, the control device 50 determines whether or not the pressure sensor abnormality flag is set to 1 (S21). If the pressure sensor abnormality flag is not set to 1 (S21; NO), the pressure sensor P2 is considered normal and, therefore, the control device 50 performs ordinary pressure control valve control (S22). Ordinary pressure control valve control is, for example, processing for adjusting the valve opening of the pressure control valve C2 on the basis of the pressure detected with the pressure sensor p2 so that the pressure of supply of oxygen to the fuel cell 20 equals the target pressure. On the other hand, if the pressure sensor abnormality flag is set to 1 (S21; YES), the pressure sensor P2 is considered abnormal and, therefore, the control device 50 controls the pressure control valve C2 so that the valve opening is equal to or larger than a predetermined opening (S23). The valve opening at this time is preferably 80% or more, most preferably the full opening. The pressure control valve C2 may be either or an on/off valve and a linear valve.

Gas condition values including the pressures and flow rates of oxidizing gas flowing in the oxidizing gas passages (including the oxygen supply passage 41 and the oxygen discharge passage 42) in the case where the valve opening of the pressure control valve C2 is fixed at the predetermined opening in the event of an abnormality in the pressure sensor P2 are obtained in advance by an experiment or the like and are stored as map data in the control device 50. In the event of an abnormality in the pressure sensor P2, the control device 50 keeps the valve opening of the pressure control valve C2 at the predetermined opening, estimates values including the pressures and flow rates of the oxidizing gas flowing in the oxidizing gas passages by referring to the above-mentioned map data, and controls the circulation pump A2 and the hydrogen exhaust valve A3 on the basis of the estimated values, thereby controlling the pressures and the flow rates of the fuel gas flowing in the fuel gas passages (including the hydrogen supply passage 31, the hydrogen circulation passage 32 and the hydrogen discharge passage 33) and the rate of flow of a refrigerant flowing in a cooling system (not shown). In the event of an abnormality in the pressure sensor P2, the upper limit value of the amount of electric power generation in the fuel cell 20 is set to a value smaller than that set during normal operation. Accordingly, electric power supply control is performed so that the load required as the external load R does not exceed the power generation amount upper limit value.

According to this embodiment, even in a situation where an abnormality occurs in the pressure sensor P2 for detecting the oxygen pressure due to a disconnection or the like, the pressure control valve C2 is opened by setting the opening thereof to a value equal to or larger than the predetermined opening to enable the cell operation to be performed while preventing the pressure on the cathode side from becoming excessively high even when the air flow rate increase at a high load, and preventing damage to the system component parts. In a case where the load is small and the air flow rate is low, the operating pressure on the cathode side is close to the atmospheric pressure and drying up occurs easily. The cell operation can be performed even in such a case. Even in the event of an abnormality in the pressure sensor P2, therefore, there is no need to immediately stops the cell operation and limp home run to the nearest dealer, a shop or a safe zone can be performed.

While the description has been made by way of example with respect to a fail-safe measure in the event of an abnormality in the pressure sensor P2 for detecting the oxygen pressure, limp home run can also be enabled by controlling the valve opening of the pressure control valve A1 above a predetermined opening in the event of an abnormality in the pressure sensor P1 for detecting the hydrogen pressure.

Further, according to the above description, the pressure control valve C2 is disposed only in the oxygen discharge passage 42 in the oxidizing gas passages including the oxygen supply passage 41 and the oxygen discharge passage 42, and the pressure control valve A1 is disposed only in the hydrogen supply passage 31 in the fuel gas passages including the hydrogen supply passage 31, the hydrogen circulation passage 32 and the hydrogen discharge passage 33. However, each of the pressure controls valves C2 and A1 may be provided at least one of the supply passage 41, 31, or 32 and the discharge passage 42, 32, or 33.

Also, while the pressure sensors P1 and P2 have been described as means for detecting gas condition values of reactive gas by way of example in the above description, the present invention is not limited to this; the present invention can also be applied in a case where an abnormality occurs in gas condition detection means such as a flow rate detection means for detecting the rate of flow of reactive gas, a temperature detection means for detecting the temperature of reactive gas and a concentration detection means for detecting the concentration of reactive gas.

According to the present invention, the cell operation can be continued for a while without being immediately stopped in the event of an abnormality in the gas condition detection means (gas condition detector). Therefore, the present invention can be widely used in fuel cell systems of which such an operation is required.

We claim:

1. A fuel cell system comprising:
   a fuel cell which generates electric power by being supplied with a fuel gas and an oxidizing gas;
   a reactive gas supply device which supplies either one reactive gas of the fuel gas and the oxidizing gas to the fuel cell;
   a pressure detection means for detecting the pressure of either one reactive gas;
   a pressure control valve for controlling the pressure of either one reactive gas; and
   a control device which adjusts the valve opening of the pressure control valve on the basis of the pressure detected by the pressure detection means,
   wherein the control device is programmed to set the valve opening of the pressure control valve to a fixed opening of 80% or more without stopping supplying the fuel gas and the oxidizing gas when detecting an abnormality in the pressure detection means and to continue the operation of the fuel cell.

2. The fuel cell system according to claim 1, wherein the control device is programmed to set the valve opening of the pressure control valve to a fixed full opening when detecting an abnormality in the pressure detection means.

3. The fuel cell system according to claim 1, wherein the pressure control valve is provided in a fuel gas passage in which fuel gas to be supplied to the fuel cell or fuel gas discharged from the fuel cell flows and an oxidizing gas passage in which oxidizing gas to be supplied to the fuel cell or oxidizing gas discharged from the fuel cell flows.

4. The fuel cell system according to claim 1, wherein, when the detection value from the pressure detection means is out of a predetermined range, the control device is programmed to determine that an abnormality has occurred in the pressure detection means.

5. The fuel cell system according to claim 4, wherein, if the detection value from the pressure detection means is kept out of the predetermined range over a certain time period, the control device is programmed to determine that an abnormality has occurred in the pressure detection means.

6. The fuel cell system according to claim 1, wherein the control device is programmed to estimate the pressure of either one reactive gas corresponding to the valve opening of the pressure control valve when detecting an abnormality in the pressure detection means, and to control electric power generation in the fuel cell on the basis of the estimated value.

7. The fuel cell system according to claim 6, wherein the pressure control valve is provided in an oxidizing gas passage in which oxidizing gas to be supplied to the fuel cell or oxidizing gas discharged from the fuel cell flows, and wherein the control device stores as map data the pressures of oxidizing gas flowing in portions of the oxidizing gas passage in the case where the valve opening of the pressure control valve provided in the oxidizing gas passage is fixed at the fixed opening, and the control device is programmed to estimate the pressures of oxidizing gas flowing in the oxidizing gas passage by referring to the map data, and to control electric power generation in the fuel cell on the basis of the estimated value.

8. A fuel cell system comprising:
   a fuel cell which generates electric power by being supplied with a fuel gas and an oxidizing gas;
   a reactive gas supply device which supplies either one reactive gas of the fuel gas and the oxidizing gas to the fuel cell;
   a gas condition detection means for detecting a gas condition of either one reactive gas;
   a pressure control valve for controlling the pressure of either one reactive gas; and
   a control device which adjusts the valve opening of the pressure control valve on the basis of the gas condition detected by the gas condition detected by the gas condition detection means;
   wherein the control device is programmed to set the valve opening of the pressure control valve to a fixed opening of 80% or more without stopping supplying the fuel gas and the oxidizing gas when detecting an abnormality in the pressure detection means and to continue the operation of the fuel cell.

9. The fuel cell system according to claim 8, wherein the gas condition detected by the gas condition detection means is at least one of the flow rate, the temperature and the concentration of the reactive gas.

10. The fuel cell system according to claim 8, wherein the control device is programmed to estimate a gas condition value of either one reactive gas corresponding to the valve opening of the pressure control valve when detecting an abnormality in the gas condition detection means, and to control electric power generation in the fuel cell on the basis of the estimated value.

11. A fuel cell vehicle having as a vehicle power supply the fuel cell system according to claim 1.

* * * * *

UNITED STATES PATENT AND TRADEMARK OFFICE
CERTIFICATE OF CORRECTION

| | | |
|---|---|---|
| PATENT NO. | : 8,057,948 B2 | Page 1 of 1 |
| APPLICATION NO. | : 11/794890 | |
| DATED | : November 15, 2011 | |
| INVENTOR(S) | : Sadao Takaki et al. | |

It is certified that error appears in the above-identified patent and that said Letters Patent is hereby corrected as shown below:

In the Cover Page, Col. 1:    Replace "(86) PCT No.:   PCT/JP2006/000406" with --(86) PCT No.:   PCT/JP2006/300406--.

| Column | Line | |
|---|---|---|
| 8 | 42 | Delete "detected by the gas condition". |

Signed and Sealed this
Sixth Day of March, 2012

David J. Kappos
*Director of the United States Patent and Trademark Office*